US011188336B2

(12) United States Patent
Wright

(10) Patent No.: US 11,188,336 B2
(45) Date of Patent: Nov. 30, 2021

(54) REPLAY OF PARTIALLY EXECUTED INSTRUCTION BLOCKS IN A PROCESSOR-BASED SYSTEM EMPLOYING A BLOCK-ATOMIC EXECUTION MODEL

(71) Applicant: QUALCOMM Incorporated, San Diego, CA (US)

(72) Inventor: Gregory Michael Wright, Chapel Hill, NC (US)

(73) Assignee: Qualcomm Incorporated, San Diego, CA (US)

( * ) Notice: Subject to any disclaimer, the term of this patent is extended or adjusted under 35 U.S.C. 154(b) by 898 days.

(21) Appl. No.: 15/252,323

(22) Filed: Aug. 31, 2016

(65) Prior Publication Data

US 2017/0185408 A1 Jun. 29, 2017

Related U.S. Application Data

(60) Provisional application No. 62/271,475, filed on Dec. 28, 2015.

(51) Int. Cl.
*G06F 9/30* (2018.01)
*G06F 9/38* (2018.01)

(52) U.S. Cl.
CPC ...... *G06F 9/30181* (2013.01); *G06F 9/30043* (2013.01); *G06F 9/3832* (2013.01); *G06F 9/3861* (2013.01)

(58) Field of Classification Search
CPC .................. G06F 11/1407; G06F 9/30181
See application file for complete search history.

(56) References Cited

U.S. PATENT DOCUMENTS 5,832,202 A 11/1998 Slavenburg et al.
6,832,367 B1 12/2004 Choi et al.
(Continued)

FOREIGN PATENT DOCUMENTS

| CN | 103119556 A | 5/2013 |
|---|---|---|
| JP | H09509515 A | 9/1997 |
| JP | H11500551 A | 1/1999 |
| JP | 2009501366 A | 1/2009 |
| WO | 2010043401 A2 | 4/2010 |
| WO | 2013044256 A1 | 3/2013 |

OTHER PUBLICATIONS

Second Written Opinion for PCT/US2016/065740, dated Dec. 6, 2017, 10 pages.
(Continued)

*Primary Examiner* — George Giroux
(74) *Attorney, Agent, or Firm* — Withrow & Terranova, PLLC

(57) ABSTRACT

Replay of partially executed instruction blocks in a processor-based system employing a block-atomic execution model is disclosed. In one aspect, a partial replay controller is provided in a processor(s) of a central processing unit (CPU). If an instruction is detected in the instruction block associated with a potential architectural state modification, or an exception occurs during execution of instructions, the instruction block is re-executed. During re-execution of the instruction block, the partial replay controller is configured to record produced results from load/store instructions. Thus, if an exception occurs during re-execution of the instruction block, previously recorded produced results for the executed load/store instructions before the exception occurred are replayed during re-execution of the instruction block after the exception is resolved. Thus, execution of instructions leading up to side-effect operations in the instruction block can be deterministically repeated with previously produced results, without repeating the side-effects.

30 Claims, 8 Drawing Sheets

(56) References Cited

U.S. PATENT DOCUMENTS

| | | | |
|---|---|---|---|
| 7,506,318 | B1 | 3/2009 | Lindo et al. |
| 7,958,497 | B1 | 6/2011 | Lindo et al. |
| 8,316,352 | B2 | 11/2012 | Lev et al. |
| 8,402,318 | B2 | 3/2013 | Nieh et al. |
| 8,473,919 | B2 | 6/2013 | Cutler |
| 8,832,660 | B2 | 9/2014 | Lindo et al. |
| 9,170,915 | B1 | 10/2015 | Fateev |
| 2008/0115042 | A1* | 5/2008 | Akkary .............. G06F 9/3004 714/806 |
| 2009/0106329 | A1* | 4/2009 | Masuda ............ G06F 17/30377 |
| 2013/0080738 | A1 | 3/2013 | Plondke et al. |
| 2015/0277968 | A1 | 10/2015 | Gottschlich et al. |

OTHER PUBLICATIONS

Desikan, Rajagopalan et al., "Scalable Selective Re-Execution for EDGE Architectures," ASPLOS 2004, Proceedings of the 11th international conference on Architectural support for programming languages and operating systems, Oct. 7-13, 2004, Boston, MA, ACM, pp. 120-132.

Mao, Mengjie et al., "Distributed Control Independence for Composable Multi-processors," 2012 IEEE/ACIS 11th International Conference on Computer and Information Sciences, May 30, 2012, IEEE, pp. 124-129.

Sankaralingam, Karthikeyan et al., "TRIPS: A Polymorphous Architecture for Exploiting ILP, TLP, and DLP," ACM Transactions on Architecture and Code Optimization, vol. 1, No. 1, Mar. 2004, pp. 62-93.

Smith, Aaron et al., "Compiling for EDGE Architectures," Proceedings of the International Symposium on Code Generation and Optimization (CGO '06), Mar. 2006, IEEE, 11 pages.

International Search Report and Written Opinion for PCT/US2016/065740, dated Mar. 24, 2017, 19 pages.

International Preliminary Report on Patentability for PCT/US2016/065740, dated Mar. 16, 2018, 10 pages.

\* cited by examiner

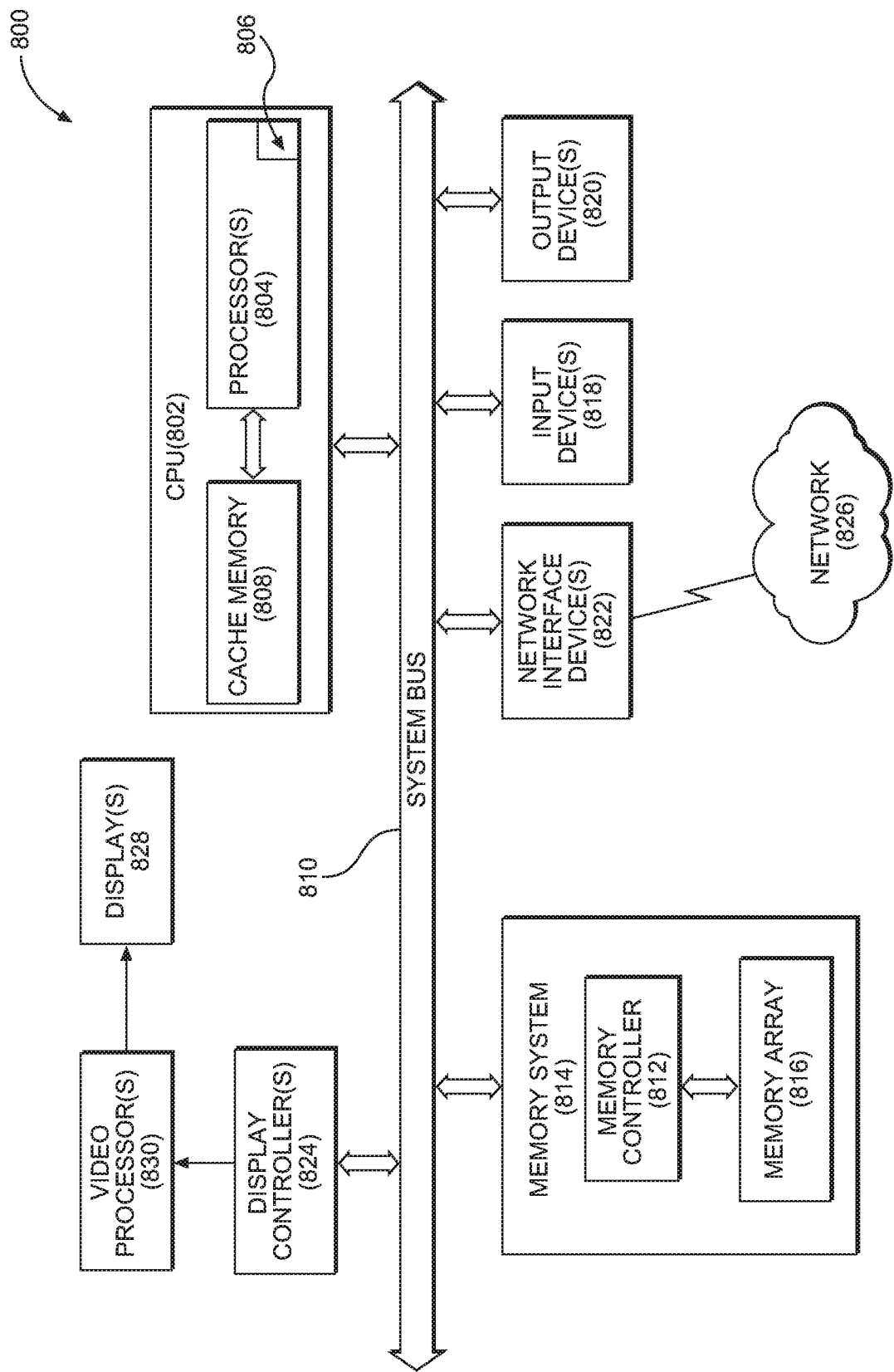

REPLAY OF PARTIALLY EXECUTED INSTRUCTION BLOCKS IN A PROCESSOR-BASED SYSTEM EMPLOYING A BLOCK-ATOMIC EXECUTION MODEL

PRIORITY APPLICATION

The present application claims priority under 35 U.S.C. § 119(e) to U.S. Provisional Patent Application Ser. No. 62/271,475 filed on Dec. 28, 2015, and entitled "REPLAY OF PARTIALLY-EXECUTED INSTRUCTION BLOCKS IN A PROCESSOR-BASED SYSTEM EMPLOYING A BLOCK-ATOMIC EXECUTION MODEL," the contents of which is incorporated herein by reference in its entirety.

BACKGROUND

I. Field of the Disclosure

The technology of the disclosure relates generally to execution of instructions in a processor-based system, and more particularly to processor-based systems employing a block-atomic execution model in which instructions are grouped into instruction blocks in which either all instructions in the instruction block are committed or none of the instructions are committed.

II. Background

Microprocessors perform computational tasks in a wide variety of applications. A conventional microprocessor application includes a central processing unit (CPU) that includes or more processors, also known as "processor cores," that execute software instructions. The software instructions instruct a CPU to perform operations based on data. Examples of such data include immediate values encoded in instruction fetch data, data stored in a register, data from a location in memory, and data from external devices, such as input/output (I/O) devices. The CPU performs an operation according to the instructions to generate a result. The result may then be stored in a register or memory, or provided as output to an I/O device.

Some CPUs employ a "block-atomic" execution model. In a block-atomic execution model, a set of instructions (e.g., 128 instructions) is grouped into instruction blocks. For example, FIG. 1 illustrates an exemplary instruction block 100 comprised of a plurality of instructions 102(1)-102(N) to be executed by a processor employing a block-atomic execution model. A processor operating according to a block-atomic execution model logically fetches, executes, and commits the instruction block 100 as a single entity. A block-atomic execution model has an advantage of reducing the complexity of an out-of-order processor (OoP). For example, an OoP that employs a block-atomic execution model does not have to report back the precise state of the processor after execution of each instruction. In this regard, in the example instruction block 100 shown in FIG. 1, intermediate produced results 104(1), 104(2), 104(4), 104(N-2)-104(N) from execution of the instructions 102(1), 102(2), 102(4), 102(N-2)-102(N) that would otherwise be stored in global registers do not need to be saved to registers. Taking instruction 102(1) as an example, its intermediate produced result 104(1) can be provided to a consumer instruction 102(2) in the instruction block 100 in a peer-to-peer manner without having to save the intermediate produced result 104(1). This enables fewer register read and write operations. However, in a block-atomic execution model, all the instructions must be executed before the external execution results (e.g., to memory, an I/O device, etc.) of the instruction block 100 can be committed since intermediate produced results are not stored in global registers. For example, as shown in FIG. 1, if an exception 108 occurs (e.g., a precise exception, such as a page fault, or a debug breakpoint or set point) during the execution of the instruction 102(4) inside the instruction block 100, the remaining instructions 102(N-2)-102(N) are not executed, because the intermediate produced results 104(1), 104(2), 104(4) are not preserved wherein execution could begin at the next instruction 102(N-2). The instruction block 100 is re-executed from the beginning after the exception 108 is resolved.

Thus, while a processor employing a block-atomic execution model has the advantage of reduced complexity, a processor employing a block-atomic execution model has a disadvantage of having to execute all instructions in an instruction block before external results are committed. As an example, this can make debugging more difficult in the presence of a multi-threaded CPU, because it is generally not possible to reproduce whatever behavior led to an exception or breakpoint that occurred during execution of an instruction block. The intermediate produced results of the instruction block, which may have been read from a previous write operation in another thread, are not stored. This also presents difficulties with side-effect operations, such as I/O device side-effects, where an I/O operation has already been executed prior to an exception occurring. For example, if execution of I/O operation instruction 102(4) in the instruction block 100 in FIG. 1 was initiated but not completed prior to the occurrence of the exception 108, the intermediate data read from the I/O operation in instruction 102(4) may no longer be available during re-execution of the instruction block 100. Thus, in this example, the intermediate data read during the first execution of instruction 102(4) may not be reproducibly stored in a register r2.

SUMMARY OF THE DISCLOSURE

Aspects disclosed herein include replay of partially executed instruction blocks in a processor-based system employing a block-atomic execution model. In this regard, in one aspect, a partial replay controller is provided in a processor(s) of a central processing unit (CPU) that employs a block-atomic execution model. In a block-atomic execution model, instructions are grouped in instruction blocks that are fully executed in a processor (e.g., an out-of-order processor (OoP)) before external produced results are committed. This resolves all load/store dependencies that can affect the values of the external produced results, and thus an architectural state of the processor and other processes dependent on such externally produced results. To avoid produced results from load/store operations not being able to be reproduced during re-execution of an instruction block loaded due to an exception, the partial replay controller is configured to record/replay results of load/store instructions during re-execution of the instruction block. In this regard, in certain aspects, if an instruction is detected in the instruction block as associated with a potential architectural state modification (e.g., a potential side-effect), or an exception occurs, during execution of instructions in the instruction block, the instruction block is re-executed. During re-execution of the instruction block, the partial replay controller is configured to record the produced results from the load/store instructions. Thus, if an exception occurs during re-execution of the instruction block, the previously recorded produced results for the executed load/store instructions before the exception occurred can be replayed during re-execution of the instruction block after the exception is resolved. In this manner, execution of instructions leading up to the operations associated with a potential architectural state modification or before an exception occurs can be deterministically repeated with the previously produced results, without repeating side-effects.

Note however that if an exception does not occur during re-execution of the instruction block, this means that all instructions in the instruction block were fully executed with the produced results being recorded. Since the instruction block in this instance is not re-executed, there is no need to replay the recorded produced results for the load/store instructions previously executed.

In this regard, in one exemplary aspect, a partial replay controller for controlling execution replay of an instruction block executed in a processor is provided. The partial replay controller comprises a detection circuit configured to set a record/replay state to an active state for an instruction block, in response to detection of an instruction associated with a potential architectural state modification, or an occurrence of an exception in the processor. The partial replay controller also comprises a record/replay circuit. In response to the record/replay state being an active state for the instruction block, the record/replay circuit is configured to inspect an entry state in a record/replay log file corresponding to a next load/store instruction to be executed in the instruction block to determine if previously produced data is recorded for the next load/store instruction. Also in response to the record/replay state being an active state for the instruction block, the record/replay circuit is also configured to record produced data of the executed next load/store instruction in the record/replay log file, in response to the previously produced data not being recorded in the record/replay log file for the next load/store instruction. Also in response to the record/replay state being an active state for the instruction block, the record/replay circuit is also configured to execute the next load/store instruction using the previously produced data recorded for the next load/store instruction in the record/replay log file, in response to the previously produced data being recorded in the record/replay log file for the next load/store instruction.

In another exemplary aspect, a partial replay controller for controlling execution replay of an instruction block executed in a processor is provided. The partial replay controller comprises a means for setting a means for storing a record/replay state to an active state for an instruction block, in response to detection of an instruction associated with a potential architectural state modification, or an occurrence of an exception in the processor. The partial replay controller also comprises a means for inspecting an entry state in a means for storing a record/replay log file corresponding to a next load/store instruction to be executed in the instruction block to determine if previously produced data is recorded for the next load/store instruction, in response to the means for storing the record/replay state to an active state for the instruction block. The partial replay controller also comprises a means for recording produced data of the executed next load/store instruction in the means for storing the record/replay log file, in response to the previously produced data not being recorded in the means for storing the record/replay log file for the next load/store instruction. The partial replay controller also comprises a means for executing the next load/store instruction using the previously produced data recorded for the next load/store instruction in the means for storing the record/replay log file, in response to the previously produced data being recorded in the means for storing the record/replay log file for the next load/store instruction.

In another exemplary aspect, a method of replaying an instruction block in a processor is provided. The method comprises setting a record/replay state to an active state for an instruction block in response to detection of an instruction associated with a potential architectural state modification, or an occurrence of an exception in the processor. In response to the record/replay state being an active state for the instruction block, the method also comprises, inspecting an entry state in a record/replay log file corresponding to a next load/store instruction to be executed in the instruction block to determine if previously produced data is recorded for the next load/store instruction, recording produced data of the executed next load/store instruction in the record/replay log file, in response to the previously produced data not being recorded in the record/replay log file for the next load/store instruction, and executing the next load/store instruction using the previously produced data recorded for the next load/store instruction in the record/replay log file, in response to the previously produced data being recorded in the record/replay log file for the next load/store instruction.

In another exemplary aspect, a non-transitory computer-readable medium having stored thereon computer executable instructions is provided. The computer executable instructions, when executed by a processor, cause the processor to set a record/replay state to an active state for an instruction block, in response to detection of an instruction associated with a potential architectural state modification, or an occurrence of an exception in the processor. In response to the record/replay state being an active state for the instruction block, the computer executable instructions, when executed by the processor, also cause the processor to inspect an entry state in a record/replay log file corresponding to a next load/store instruction to be executed in the instruction block to determine if previously produced data is recorded for the next load/store instruction. In response to the record/replay state being an active state for the instruction block, the computer executable instructions, when executed by the processor, also cause the processor to record produced data of the executed next load/store instruction in the record/replay log file, in response to the previously produced data not being recorded in the record/replay log file for the next load/store instruction. In response to the record/replay state being an active state for the instruction block, the computer executable instructions, when executed by the processor, also cause the processor to execute the next load/store instruction using the previously produced data recorded for the next load/store instruction in the record/replay log file, in response to the previously produced data being recorded in the record/replay log file for the next load/store instruction.

BRIEF DESCRIPTION OF THE FIGURES

FIG. 8 is a block diagram of an exemplary processor-based system that includes a multi-processor CPU that includes a partial replay controller configured to record and/or replay results of load/store instructions during re-execution of an instruction block, in response to detecting an instruction in the instruction block associated with a potential architectural state modification and/or an occurrence of an exception during an idle execution state of the instruction block, according to the examples disclosed herein.

DETAILED DESCRIPTION

Figure 1:
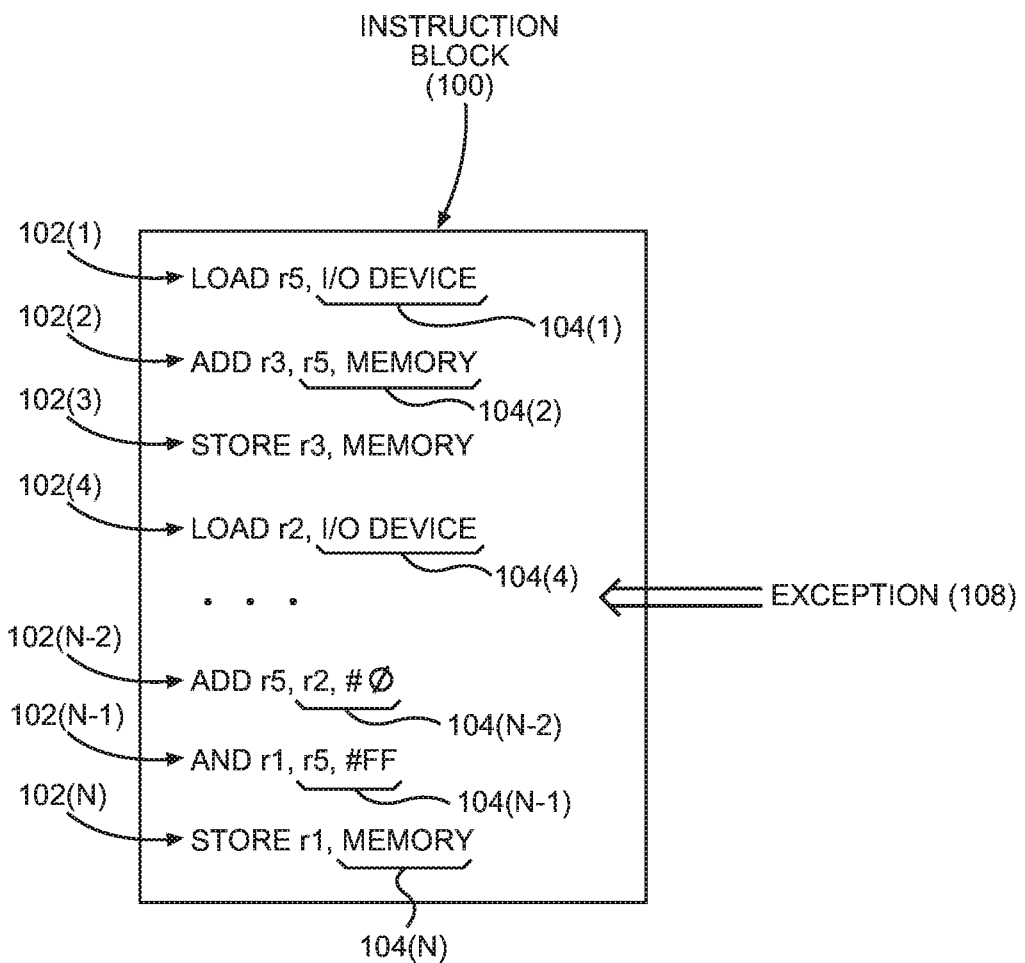
FIG. 1 illustrates an exemplary instruction block configured to be executed by a central processing unit (CPU) employing a block-atomic execution model, wherein an exception occurred during execution of instructions in the instruction block after an input/output (I/O) operation executed in the instruction block.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include replay of partially executed instruction blocks in a processor-based system employing a block-atomic execution model. In this regard, in one aspect, a partial replay controller is provided in a processor(s) of a central processing unit (CPU) that employs a block-atomic execution model. In a block-atomic execution model, instructions are grouped in instruction blocks that are fully executed in a processor (e.g., an out-of-order processor (OoP)) before external produced results are committed. This resolves all load/store dependencies that can affect the values of the external produced results, and thus an architectural state of the processor and other processes dependent on such externally produced results. To avoid produced results from load/store operations not being able to be reproduced during re-execution of an instruction block loaded due to an exception, the partial replay controller is configured to record/replay results of load/store instructions during re-execution of the instruction block. In this regard, in certain aspects, if an instruction is detected in the instruction block as associated with a potential architectural state modification (e.g., a potential side-effect), or an exception occurs, during execution of instructions in the instruction block, the instruction block is re-executed. During re-execution of the instruction block, the partial replay controller is configured to record the produced results from the load/store instructions. Thus, if an exception occurs during re-execution of the instruction block, the previously recorded produced results for the executed load/store instructions before the exception occurred can be replayed during re-execution of the instruction block after the exception is resolved. In this manner, execution of instructions leading up to the operations associated with a potential architectural state modification or before an exception occurs can be deterministically repeated with the previously produced results, without repeating side-effects.

Figure 2:
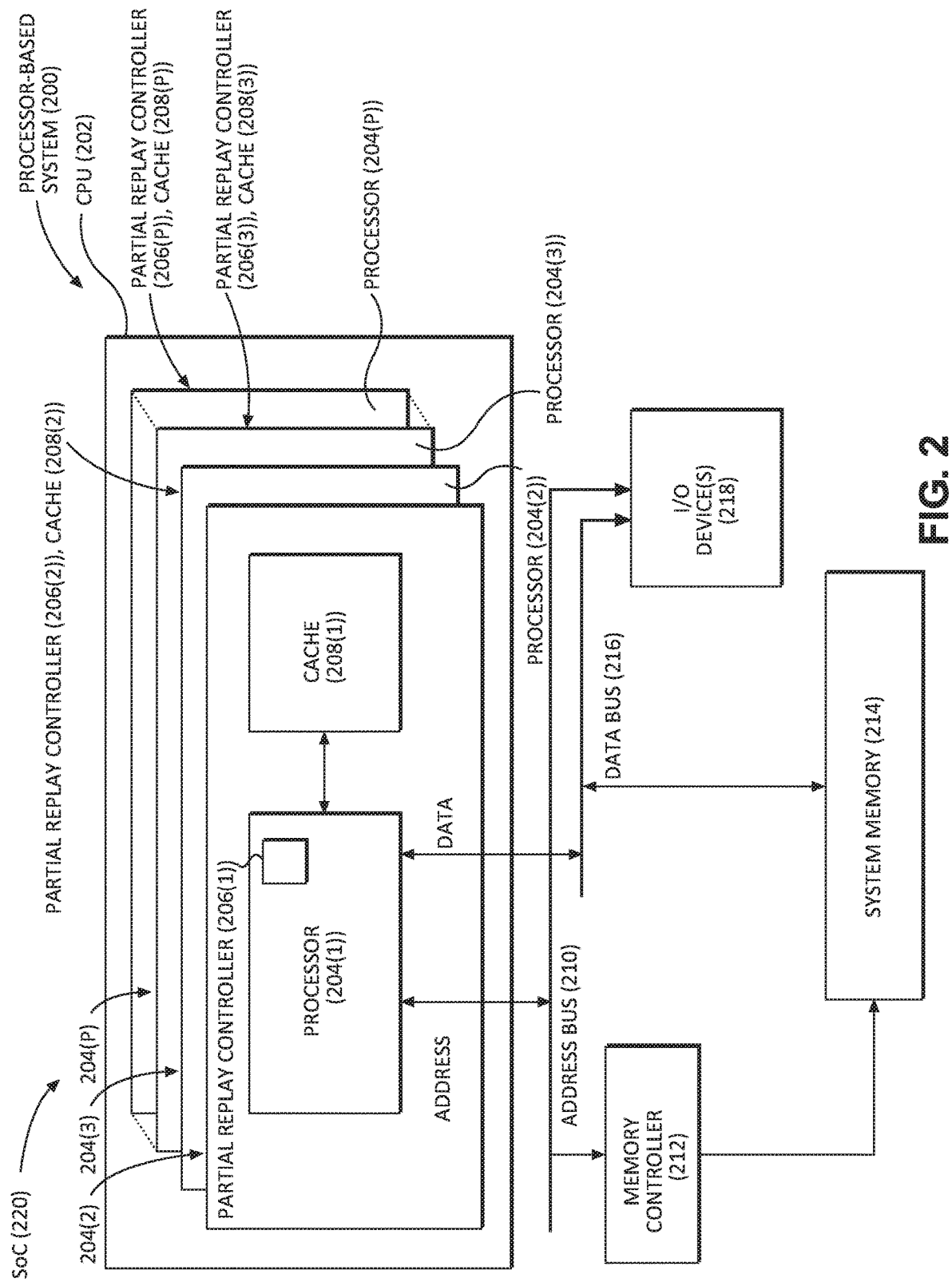
FIG. 2 is a block diagram of an exemplary multiple processor ("multi-processor") CPU, wherein each processor is configured to execute software instructions to perform functions, including accesses to external memory and I/O devices.

In this regard, FIG. 2 is a block diagram of an exemplary processor-based system 200 that includes a CPU 202 having multiple processor cores 204(1)-204(P), which are referenced herein as processors 204(1)-204(P), wherein 'P' is the number of processors 204 included in the CPU 202. As a non-limiting example, the processors 204(1)-204(P) may be out-of-order processors (OoPs) that are configured to perform out-of-order execution of instructions based on the availability of input data. This is opposed to an in-order processor that must execute instructions according to their original order in a program, to avoid being idle while waiting for the preceding instruction to complete to retrieve data for the next instruction in a program. One or more processors 204(1)-204(P) in the CPU 202 in this example include a partial replay controller 206(1)-206(P). In this example, each processor 204(1)-204(P) in the CPU 202 includes a partial replay controller 206(1)-206(P), but such is not required.

As will be discussed in more detail below starting at FIG. 3, the partial replay controllers 206(1)-206(P) that are included in the processors 204(1)-204(P) are each configured to record and/or replay results of load/store instructions during re-execution of an instruction block, in response to detecting an instruction associated with a potential architectural state modification (e.g., a potential side-effect) during execution of instructions in the instruction block. Before discussing the aspects of the partial replay controllers 206(1)-206(P), a description of the other components of the CPU 202 in FIG. 2 are first discussed below.

In this regard, with continuing reference to FIG. 2, each processor 204(1)-204(P) in this example can include a cache memory ("cache") 208(1)-208(P) (e.g., a Level 2 (L2) cache) for providing access to cached data on-processor without having to provide a memory access request (at "address") off-processor onto an address bus 210. For off-processor memory access requests, the processors 204(1)-204(P) are configured to provide an "address" on the address bus 210 to a memory controller 212 for accessing a system memory 214. "Data" to be written by a requesting processor 204(1)-204(P) is provided to the system memory 214 via a data bus 216. "Data" read from the system memory 214 is provided on the data bus 216 by the system memory 214 to be provided to the requesting processor 204(1)-204(P). An input/output (I/O) device(s) 218 is also coupled to the address bus 210 and the data bus 216 in the processor-based system 200 in FIG. 2 to provide the processors 204(1)-204(P) access to the I/O device(s) 218. The processor-based system 200 could be provided as a system-on-a-chip (SoC) 220, wherein the processors 204(1)-204(P) and the related components illustrated in FIG. 2 and described above are integrated together on a chip.

Figure 3:
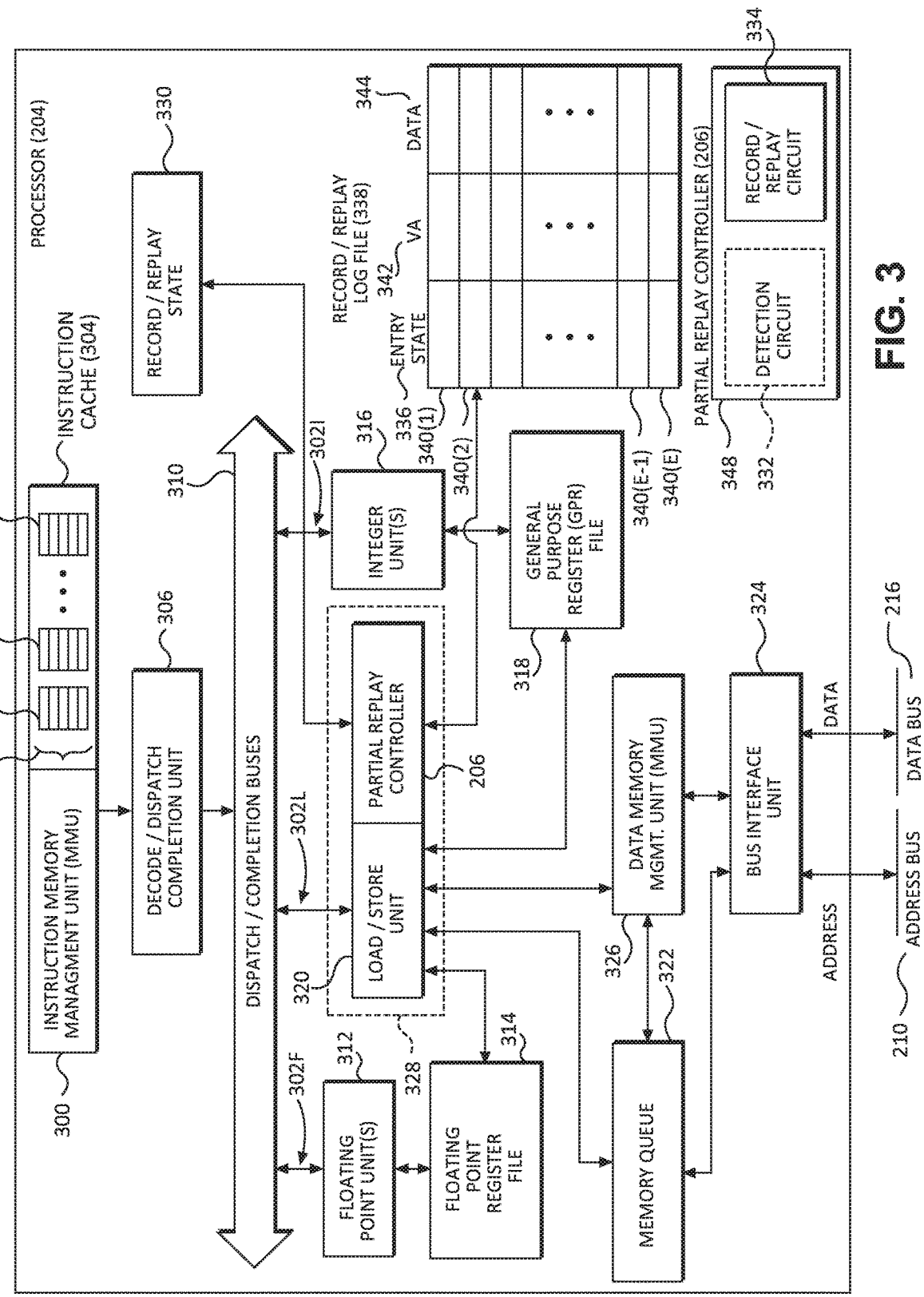
FIG. 3 is a block diagram illustrating exemplary detail of a processor that can be included in the multi-processor CPU in FIG. 2, wherein the processor includes a partial replay controller configured to record and/or replay results of load/store instructions during re-execution of an instruction block, in response to detecting an instruction in the instruction block associated with a potential architectural state modification, and/or in response to an occurrence of an exception, during execution of instructions in the instruction block.

Exemplary details of each processor 204(1)-204(P) in the CPU 202, including an exemplary partial replay controller and supporting data structures is shown in FIG. 3 generally as "processor 204." As shown therein, the processor 204 includes an instruction memory management unit (MMU) 300 that can fetch instructions 302 stored in an instruction cache 304 to provide to a decode/dispatch completion unit 306. The instruction cache 304 may load the instructions 302 to be executed from a main memory, such as the system memory 214 in FIG. 2. In this example, the instructions 302 are grouped together into an instruction block 308 to be executed. The decode/dispatch completion unit 306 provides instructions 302 for the decoded instruction block 308 to a dispatch/completion bus(es) 310 to be executed. As previously discussed, since the processor 204 employs a block-atomic execution model, all instructions 302 in a given instruction block 308 fully execute before the results of the executed instructions 302 are committed. In this example, a floating point unit(s) 312 is provided to receive floating point instructions 302F in the instruction block 308 to be executed with the produced results stored in a floating point register file 314. Similarly, an integer unit(s) 316 is provided to receive integer instructions 302I in an executed instruction block 308 to be executed, with the produced results stored in a general purpose register (GPR) file 318. A load/store unit 320 is provided to receive load/store instructions 302L from an instruction block 308. Depending on the particular load/store instruction 302L, the produced results from the executed load/store instructions 302L can be stored in the general purpose register file 318, or a memory queue 322 for access to external memory through a bus interface unit 324 coupled to the address bus 210 and the data bus 216. Executed load/store instructions 302L requiring access to external memory are also provided to a data MMU 326 to manage the data to be read to external memory or written to external memory based on the executed load/store instructions 302L.

With continuing reference to FIG. 3, if instructions, such as the instructions 102(1)-102(N) in the exemplary instruction block 100 in FIG. 1, were executed by the processor 204 as the instruction block 308 without the partial replay controller 206 provided, and if an exception occurred during the execution of an instruction 302 inside the instruction block 308, the remaining instructions 302 in the instruction block 308 are not executed. The intermediate produced results are not preserved wherein execution could begin at the next instruction 302 in the instruction block 308 after the exception is resolved. In this regard, the instructions 302 in the instruction block 308 would be re-executed from the beginning after the exception is resolved. This could make debugging instructions 302 executed by the processor 204 difficult, because it is generally not possible to reproduce whatever behavior led to an exception that occurred during execution of instructions 302 in an instruction block 308. The intermediate produced results of the executed instructions 302 from an instruction block 308, which may have been read from a previous write operation in another thread, are not stored. This also presents difficulties with load/store instructions 302L that can have or have side-effects, such as I/O device side-effects, where an I/O operation to the I/O device(s) 218 (see FIG. 2), has already been executed prior to an exception. In this regard, if a load/store instruction 302L of an instruction block 308 was initiated but not completed prior to the exception, the intermediate data read from the I/O operation may no longer be available for re-executing the instructions 302 in the instruction block 308, because the intermediate data was not stored.

In this regard, the partial replay controller 206 is provided in the processor 204 to record and/or replay results of the load/store instructions 302L during re-execution of the instructions 302 in the instruction block 308, in response to detection of the instruction 302 in the instruction block 308 associated with a potential architectural state modification (e.g., a potential side-effect). The partial replay controller 206 can be provided as part of a load/store system 328 that includes the load/store unit 320, or separately from the load/store unit 320. An instruction 302 is associated with a potential architectural state modification if it involves an operation that modifies an architectural state in the CPU 202, including the processors 204(1)-204(P), and can have an observable interaction with functions or processes outside of the instruction block 308. For example, an instruction 302 associated with a potential architectural state modification may affect external produced results that can affect other processes and threads outside of the instruction block 308 and/or other processors 204(1)-204(P). Such instructions 302 may have load/store dependencies that can affect the values of the external produced results, and thus the architectural state of the processors 204(1)-204(P) and other processes is dependent on such externally produced results.

For example, the instruction block 308 may have an instruction 302 that can potentially modify an architectural state and thus cause a side-effect. Non-limiting examples include modifying a global variable, writing to a system configuration register, raising an expected exception (e.g., a breakpoint, set point, or watchpoint), and writing data to memory or an I/O device. An architectural state may also be modified from an operation that has a side-effect, such as reading data from a device such as an I/O device where data is popped off a queue and thus is not reproduced on a subsequent read operation. If an instruction 302 is associated with a potential architectural state modification, the behavior or other processes that are affected by the architectural state modification depend on an order of evaluation.

For instructions 302 associated with potential architectural state modifications that have or cause side-effects, it may be difficult to recreate or reproduce the conditions by which the instructions 302 operate during any re-execution of the instructions 302. Thus, if an exception were to occur before the instruction block 308 fully executed, intermediate produced results used to perform the operation of the instructions 302 associated with potential architectural state modifications may no longer be available or have the same value after the exception is resolved. However, with the partial replay controller 206 being configured to record and/or replay results of the load/store instructions 302L during re-execution of the instruction block 308 in response to detection of the instruction 302 in the instruction block 308 associated with the potential architectural state modification, the intermediate produced results can be recorded during re-execution of the instruction block 308. Thus, if an exception were to occur, such intermediate results can be replayed during another re-execution of the instruction block 308 after the exception is resolved to ensure integrity of externally produced values from the instruction block 308 that affect the architectural state of the processor 204.

For example, the exception could be a precise exception, including a block exception that occurs at an instruction block 308 execution boundary, and an instruction exception which occurs at an instruction 302 boundary within an instruction block 308. Examples of exceptions include arithmetic exceptions: divide by zero, division overflow, IEEE floating point, privilege violations (non-MMU), data page faults (page not mapped, privilege violation, write protected), uncorrectable precise error correcting code (ECC) error, and other precise hardware faults (TBD). The exception could also be a debugger breakpoint in a debugging mode or a watchpoint as other examples. The ability to record and replay previously produced data from an instruction block 308 during a debugging mode or at a watchpoint may be particularly useful to be able to see the state of all loaded or stored data during execution.

However, the processor 204 in FIG. 3 includes the partial replay controller 206 to avoid the situation of not being able to reproduce produced data from the load/store instructions 302L in the instruction block 308 in the event that the instruction block 308 must be re-executed by the processor 204, such as due to an exception occurring during the execution of the instruction block 308. As discussed in more detail below, the partial replay controller 206 is configured to allow an instruction exception to be reproducible in the processor 204 employing a block-atomic execution model. The partial replay controller 206 allows a partial block replay (PBR) model to be employed wherein a sufficient state can be reported to an exception handler or debugger to allow the instruction block 308 execution leading up to the exception to be reproduced deterministically. In such a scenario, the instruction block's 308 execution remains atomic, in the sense that it has induced no side-effects to general purpose registers and memory. Partial block replay also allows side-effect operations (strongly ordered load and store and system register writes) operations to fit within the instruction block 308 structure. The PBR model made possible by the partial replay controller 206 allows a weakening of block atomicity for instructions 302 in an instruction block 308 with side-effects. Sufficient state is saved to allow an instruction block 308 to be resumed after an exception, deterministically repeating the execution leading up to the side-effect operations, and without then repeating the side-effects themselves.

As will also be discussed in more detail below, the partial replay controller 206 may also be configured to record and/or replay results of the load/store instructions 302L during re-execution of the instruction block 308, in response to the occurrence of an actual exception in the processor 204. For example, such exceptions may include a static block exception, such as an instruction page fault, an invalid block header, and an invalid instruction encoding. Thus, after the processor 204 recovers from the exception, the partial replay controller 206 may be configured to record and/or replay results of the load/store instructions 302L during re-execution of the instruction block 308. This is so that if the exception occurs again, or another exception occurs, during re-execution of the instruction block 308, intermediate produced results of the instruction block 308, which may have been read from a previous write operation in another thread, are stored and can be replayed if the instruction block 308 must be re-executed due to the occurrence of another exception. Otherwise, intermediate data read in for performing the load/store operations, such as I/O operations, may no longer be available for re-executing the instruction block 308, because the intermediate data was not stored. Also, if the exception is a precise exception, the produced results from instructions 302 in the instruction block 308 executed before the exception occurred could be committed by the processor 204 in a partial commit operation. Thus, after the processor 204 recovers from the exception, the partial replay controller 206 may be configured to start execution from the beginning of the instruction block 308 to record and/or replay results of the load/store instructions 302L. Previously recorded results of previously executed load/store instructions 302L are replayed during the re-execution of the instruction block 308. However, in one example, any produced data from load/store instructions 302L that were committed during a previous execution of the instruction block 308 as part of a partial commit operation are not re-committed during a subsequent partial recommit operation of full commit when the instructions block 308 fully executes. This is because the results of these previously executed load/store instructions 302L have already been previously committed. Thus, employing a partial commit functionality may increase execution efficiency, because the instruction block 308 may not have to be re-executed from the beginning instruction 302 after recovering from an exception. The partial replay controller 206 can be configured to track results from previously executed load/store instructions 302L having been committed so that such results produced from replay of the load/store instructions 302L are not re-committed.

Figure 4:
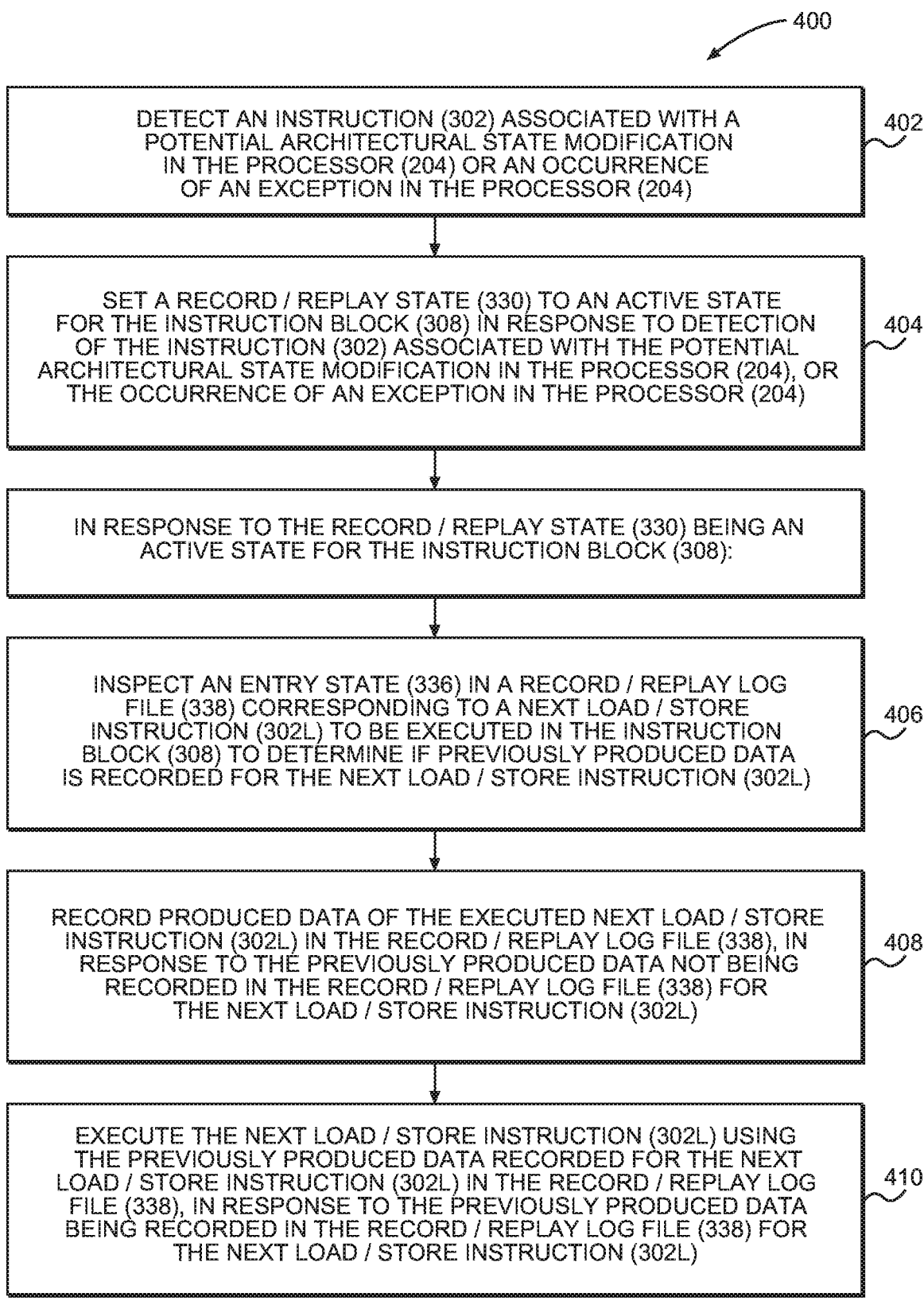
FIG. 4 is a flowchart illustrating an exemplary process that can be performed by the partial replay controller in the processor in FIG. 3 for entering a record/replay active state to record and/or replay results of load/store instructions during re-execution of an instruction block, in response to detection of the instruction associated with a potential architectural state modification and/or in response to an occurrence of an exception in the processor.

In this regard, FIG. 4 is a flowchart illustrating an exemplary process 400 that can be performed by the partial replay controller 206 in the processor 204 in FIG. 3 for entering a record/replay state in an active state to record and/or replay results of load/store instructions 302L during re-execution of the instruction block 308. In this regard, as illustrated in FIG. 4, the process 400 starts by the partial replay controller 206 detecting an instruction 302 associated with a potential architectural state modification, or an occurrence of an exception in the processor 204 during execution of the instruction block 308 (block 402 in FIG. 4). As shown in the example in FIG. 3, the partial replay controller 206 can include a detection circuit 332 that is configured to detect an instruction 302 associated with a potential architectural state modification, or the occurrence of an exception in the processor 204, during execution of the instruction block 308. The instructions 302 executed by the processor 204 are provided to the load/store unit 320, which allows the detection circuit 332 of the partial replay controller 206 to detect if the instruction 302 is associated with a potential architectural state modification.

With continuing reference to FIG. 4, in response to detection of the instruction 302 associated with a potential architectural state modification, or the occurrence of an exception during execution of the instruction block 308, the partial replay controller 206 is configured to set a record/replay state 330 to an active state for the instruction block 308 (block 404 in FIG. 4). For example, before the detection of an instruction 302 associated with a potential architectural state modification, or the occurrence of an exception in the processor 204, the record/replay state 330 may be set to an idle execution state. In response to the record/replay state 330 being an active state for the instruction block 308, the instruction block 308 is re-executed by the processor 204. If the active state is set as the record/replay state 330 in response to the occurrence of an exception, the instruction block 308 is re-executed after the exception is resolved by the CPU 202 (e.g., by the operating system in the CPU 202) (FIG. 2).

When the instruction block 308 is re-executed in response to the record/replay state 330 being the active state, the record/replay circuit 334 in the partial replay controller 206 inspects an entry state 336 in a record/replay log file 338 corresponding to each next load/store instruction 302L to be executed in the instruction block 308 before the next load/store instruction 302L is executed (block 406 in FIG. 4). The record/replay circuit 334 inspects the entry state 336 to determine if previously produced data for the next load/store instruction 302L was recorded, meaning that the next load/store instruction 302L being inspected was already executed during a previous execution of the instruction block 308 before a potential architectural state modification was detected or exception occurred during execution of the instruction block 308 (block 406 in FIG. 4). If the entry state 336 indicates that the next load/store instruction 302L to be executed was already previously executed, the produced results for the next load/store instruction 302L will be recorded in the record/replay log file 338 as this is the first instance of execution of this next load/store instruction 302L in the instruction block 308. However, if the entry state 336 indicates that the next load/store instruction 302L had not already been executed in a previous execution instance of the instruction block 308, the record/replay circuit 334 is configured to record produced data of the executed next load/store instruction 302L in the record/replay log file 338 in response to the record/replay state 330 being the active state (block 408 in FIG. 4). This is so that if the instruction block 308 must be re-executed again, the produced data of the executed next load/store instruction 302L will be available in the record/replay log file 338 to be replayed. In this regard, the record/replay circuit 334 is also configured to execute the next load/store instruction 302L using the previously produced data recorded for the next load/store instruction 302L in the record/replay log file 338 (block 410 in FIG. 4).

Figure 5:
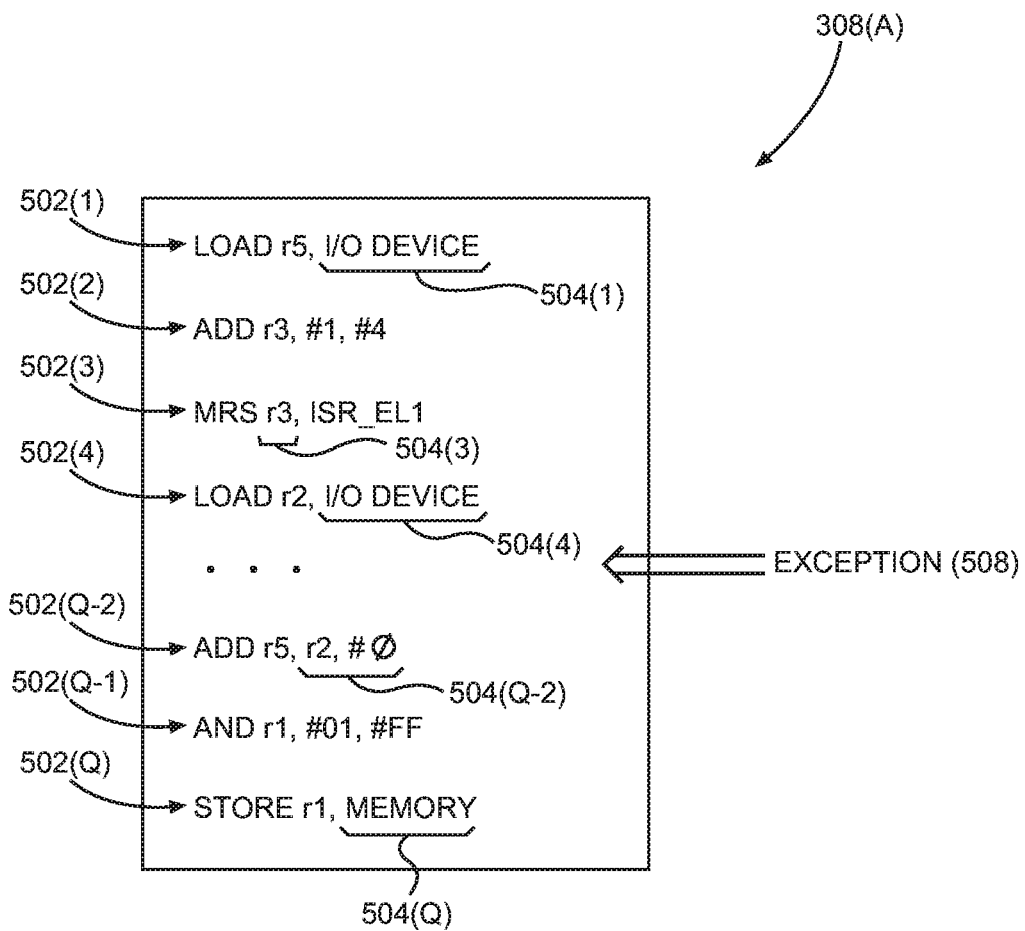
FIG. 5 illustrates an exemplary instruction block executed by the processor in FIG. 3 that includes instructions associated with a potential architectural state modification, to facilitate further exemplary discussion of the partial replay controller in FIG. 3 during execution and re-execution of the instruction block.
Figure 6:
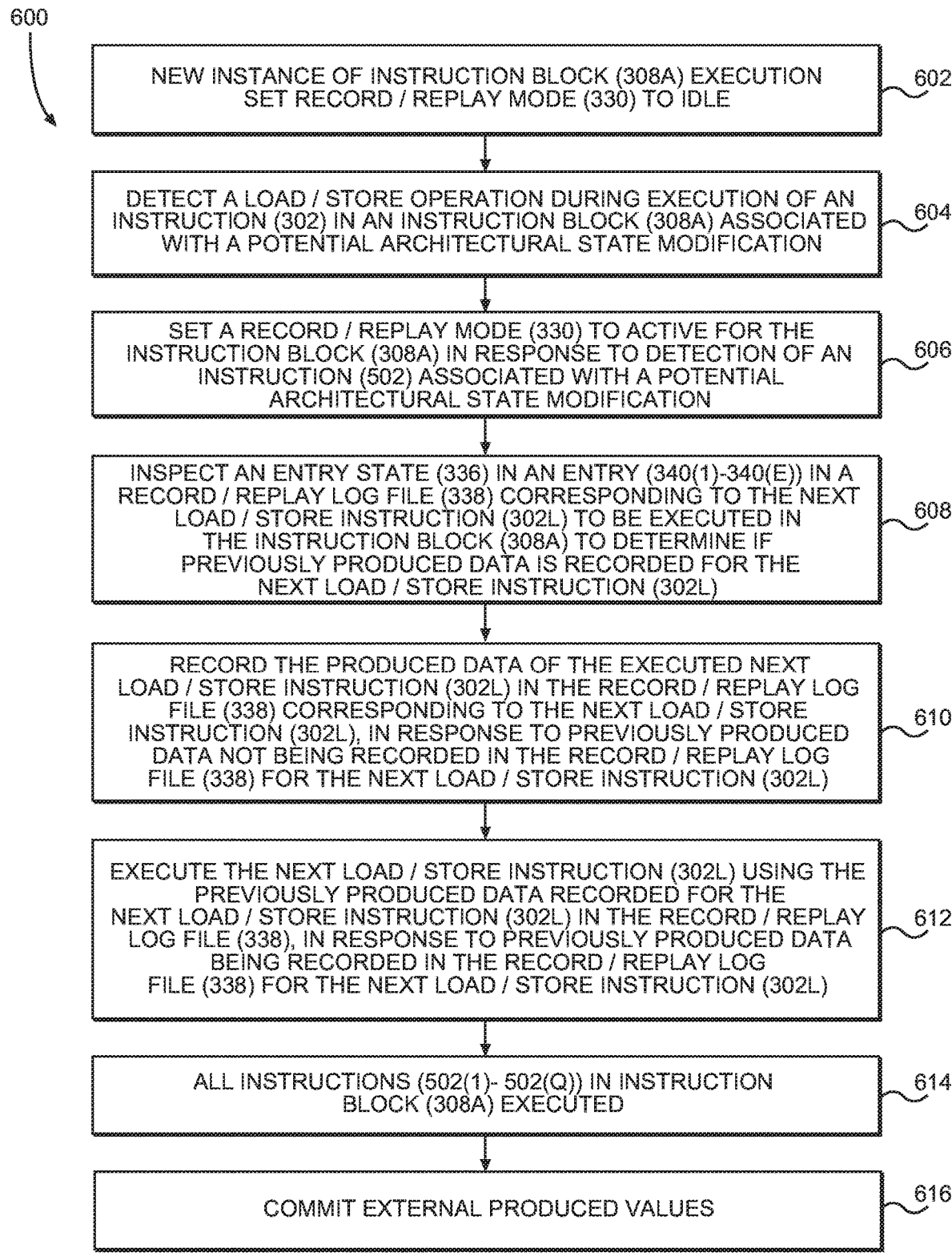
FIG. 6 is a flowchart illustrating an exemplary process that can be performed by the partial replay controller in FIG. 3 for recording and replaying results of load/store instructions during re-execution of an instruction block, in response to detecting an instruction in the instruction block associated with a potential architectural state modification.

To facilitate further discussion of the partial replay controller 206 that can be provided in the processors 204(1)-204(P) in the CPU 202 in FIG. 2, FIGS. 5 and 6 are provided to facilitate further exemplary discussion of the partial replay controller 206 in FIG. 3 during execution and re-execution of the instruction block 308. In this regard, FIG. 5 illustrates an exemplary instruction block 308(A) that can be executed by the processor 204 in FIG. 3 that includes instructions associated with a potential architectural state modification. FIG. 6 is a flowchart illustrating more detail of an exemplary process 600 that can be performed by the partial replay controller 206 to record and replay results of load/store instructions 302L during re-execution of the instruction block 308(A) in FIG. 5, in response to detecting an instruction 502 in the instruction block 308(A) associated with a potential architectural state modification. Reference to the process 600 in FIG. 6 will be made in conjunction with the instruction block 308(A) in FIG. 5.

In this regard, with reference to FIG. 5, the instruction block 308(A) is fetched by the processor 204 in FIG. 3 for execution in a new instance with the record/replay state 330 set to idle (block 602 in FIG. 6). When a first instruction 502(1), which is an I/O device load/store instruction in this example, is provided to the load/store unit 320 in FIG. 3, the detection circuit 332 of the partial replay controller 206 detects if the first instruction 502(1) is associated with a potential architectural state modification (block 604 in FIG. 6). In this example, the first instruction 502(1) has a potential side-effect that is associated with a potential architectural state modification, because a source of the data to be loaded is from an I/O device. Thus, if an exception were to occur after execution of the first instruction 502(1), the data popped from the I/O device may no longer be retained in the I/O device queue and may thus not be reproducible, before the first instruction 502(1) is re-executed during re-execution of the instruction block 308(A). Thus, in this instance, the partial replay controller 206 sets the record/replay state 330 to active for the instruction block 308(A) in response to the detection of the potential side-effect for the first instruction 502(1) without executing the first instruction 502(1). This is so that results from execution of the first instruction 502(1) are not produced that could cause a side-effect of the results not being reproducible on a next execution instance of the first instruction 502(1) during re-execution of the instruction block 308(A) (block 606 in FIG. 6). Thereafter, the processor 204 causes the instruction block 308(A) to be re-executed.

During the re-execution of the instruction block 308(A) in FIG. 5, the first instruction 502(1) is again provided to the load/store unit 320 in the processor 204 in FIG. 3 for execution. The record/replay circuit 334 in the partial replay controller 206 inspects an entry state 336 in an entry 340(1)-340(E) in the record/replay log file 338 to determine if previously produced data was recorded for the first instruction 502(1) (block 608 in FIG. 6). In this example, previously produced data was not recorded for the first instruction 502(1), because the first instruction 502(1) was not executed during the initial execution of the instruction block 308(A) due to the detection of the potential side-effect. Thus, the record/replay circuit 334 of the partial replay controller 206 records produced results 504(1) from the first instruction 502(1) as a result of the load/store unit 320 executing the first instruction 502(1) in the record/replay log file 338 so that the produced results 504(1) can be replayed in the event that the instruction block 308(A) is re-executed again, such as due to an exception (block 610 in FIG. 6). Thereafter, the processor 204 executes a second instruction 502(2) without regard to side-effect considerations, such that the second instruction 502(2) is not a load/store instruction. However, a third instruction 502(3) in the example instruction block 308(A) in FIG. 5 is a load/store operation that has a potential side-effect. However, since the record/replay state 330 is already active, meaning that the partial replay controller 206 is recording produced results 504(1)-504(Q) from executed load/store instructions 302L, the instruction block 308(A) is not re-executed. The produced results 504(3) obtained from global register r3 in the third instruction 502(3) are recorded in the record/replay log file 338. The execution of the instructions 502(4)-502(Q) continues with the produced results 504(1)-504(Q) of the load/store instructions 302L being recorded by the partial replay controller 206 in the record/replay log file 338 (blocks 608, 610 in FIG. 6).

However, as shown in the example in FIG. 5, an exception 508 occurred between instruction 502(4) and instruction 502(Q-2). After the exception 508 is resolved, the instruction block 308(A) is re-executed in the processor 204. However, since instructions 502(1)-502(4) have already been executed in a previous execution instance of the instruction block 308(A), the record/replay circuit 334 in the partial replay controller 206 is configured to check the record/replay log file 338 to determine if the produced results 504(1), 504(3)-504(4) are recorded in the record/replay log file 338 (block 608 in FIG. 6). Since in this example, the produced results 504(1), 504(3)-504(4) are recorded in the record/replay log file 338, the record/replay circuit 334 is configured to execute or "replay" the previously produced results 504(1)-504(Q) using the previously produced results 504(1), 504(3)-504(4) recorded in the record/replay log file 338 during the previous re-execution of the instruction block 308(A) in this example (block 612 in FIG. 6). Thus, if an exception or side-effect occurred with regard to the instructions 502(1), 502(3)-502(4) after the exception 508 occurred, the previously produced results 504(1), 504(3)-504(4) were preserved in the record/replay log file 338 so that the re-execution of the instruction block 308(A) will produce the correct results and produced values.

In this example, since instructions 502(Q-2)-502(Q) had not executed during the previous re-execution of the instruction block 308(A) before the exception 508 occurred, the partial replay controller 206 is configured to check the record/replay log file 338 to determine if the produced results 504(Q-2), 504(Q) for the instructions 502(Q-2), 502(Q) were recorded in the record/replay log file 338 (block 608 in FIG. 6). Because in this example, they were not recorded before the occurrence of the exception 508, the record/replay circuit 334 is configured to record the produced results 504(Q-2), 504(Q) for the instructions 502(Q-2), 502(Q) in the record/replay log file 338 (block 610 in FIG. 6), as opposed to replaying the instructions 502(Q-2), 502(Q). Thus, if another exception 508 occurs, the produced results 504(Q-2), 504(Q) for the instructions 502(Q-2), 502(Q) can be replayed from the record/replay log file 338.

After all instructions 502(1)-502(Q) are executed in the instruction block 308(A) in FIG. 5 (block 614 in FIG. 6), the external produced values resulting from the executed instructions 502(1)-502(Q) are committed (block 616 in FIG. 6).

Note that it is a design choice on which types of load/store instructions 302L are configured to be detected as having a potential side-effect by the detection circuit 332. For example, the detection circuit 332 could be configured to detect every load/store instruction 302L in an executed instruction block 308 as having a potential side-effect without regard to the type of load/store instruction 302L. For example, if the processor 204 is executing multiple-thread code, potentially any load instruction could result in non-producible results, because another thread could change the data in the source location of such load instruction after an exception occurs. However, detecting a potential side-effect in every type of load/store instruction 302L in an executed instruction block 308 could reduce performance of the processor 204, because an executed instruction block 308 may be re-executed more often. The record/replay state 330 would be set to active based on an executed instruction block 308 having any type of load/store instruction 302L. This may be useful in a debugging mode or in response to a debugger breakpoint, because the partial replay controller 206 would provide for the ability to review the state of all data from load/store instructions 302L during a debugging mode. However, as another example, during a normal or non-debugging mode, the detection circuit 332 may be configured to detect only certain types of load/store instructions 302L in an instruction block 308 as having potential side-effects that involve 110 operations without regard to other reproducibility issues. For example, the detection circuit 332 may be configured to only detect load/store instructions 302L in an instruction block 308 that load or store data from or to locations or devices external to the processor 204.

Figure 7:
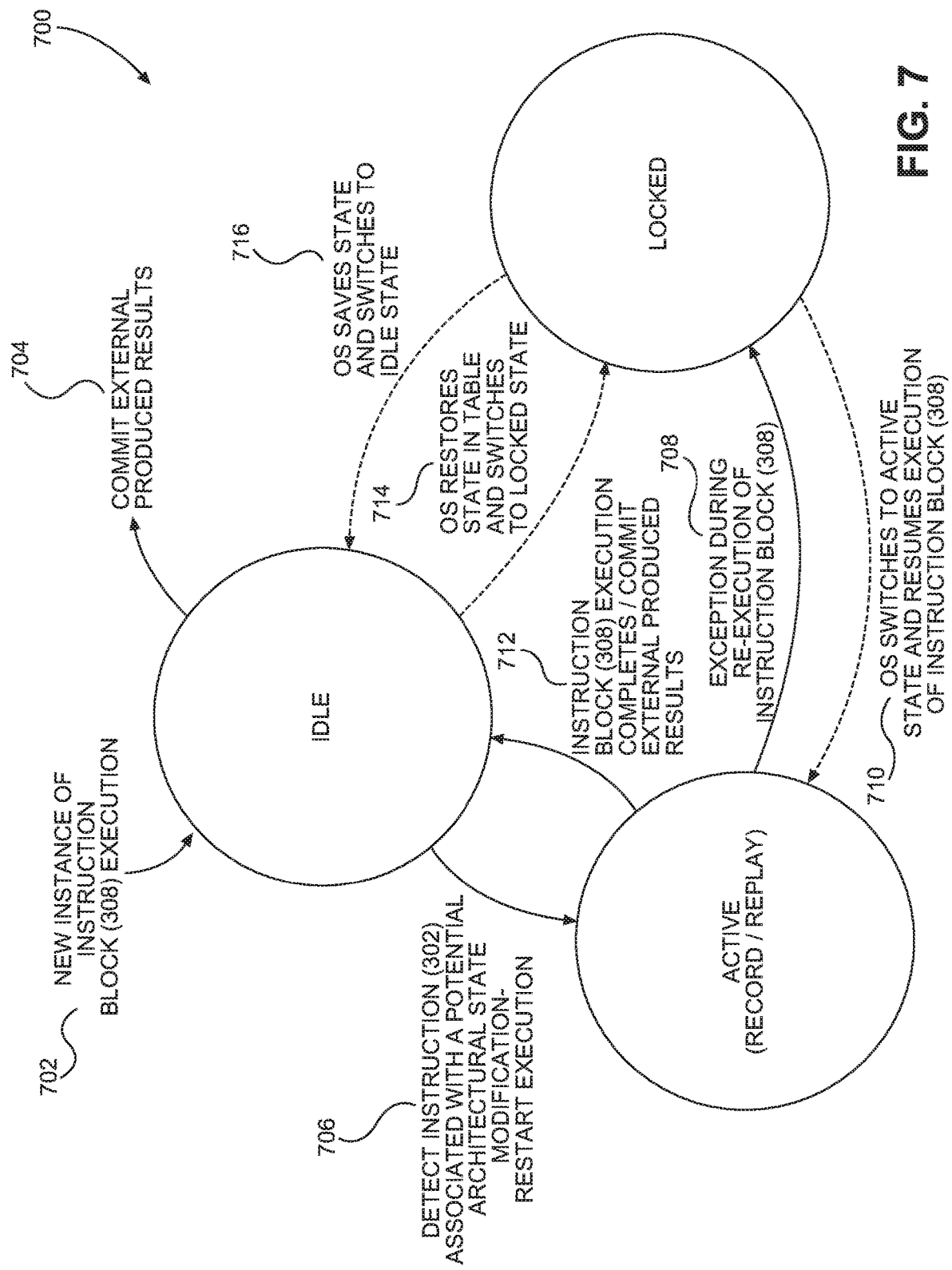
FIG. 7 is an exemplary state machine illustrating an exemplary operation of the partial replay controller in the processor in FIG. 3 during execution of the instruction block in the processor.

The operation of a partial replay controller 206 may be well suited for implementation as a state machine since an instruction block 308 can be re-executed multiple times with the operations based on the state of re-execution. In this regard, FIG. 7 is a state machine 700 that can be employed by the partial replay controller 206 in the processor 204 in FIG. 3 to record and/or replay results of load/store instructions during re-execution of an instruction block. In this regard, with reference to FIG. 7, in response to a new instance of execution of an instruction block 308 in the processor 204 (702 in FIG. 7), a record/replay state 330 accessible by the processor 204 is set to an idle state ("IDLE"), meaning that a record/replay operation is not occurring for the instruction block 308. An architectural state for such a thread, or an exception or interrupt, corresponds to an instruction block 308 boundary. The processor 204 executes the instructions 302 in the instruction block 308 in the idle state. If all the instructions 302 in the instruction block 308 are not detected as having a potential architectural state modification during the initial execution of the instruction block 308, and no exception occurs, the execution of the instructions 302 will eventually fully complete with the external produced results committed (704 in FIG. 7).

With continuing reference to FIG. 7, once the detection circuit 332 detects an instruction 302 associated with a potential architectural state modification to be executed (706 in FIG. 7), the partial replay controller 206 changes the record/replay state 330 to an active state ("ACTIVE"). The processor 204 then causes the instruction block 308 to be re-executed from the beginning instruction 302. This is so that the instruction block 308 can be re-executed and the produced results for the load/store instructions 302L having potential side-effects can be recorded in the record/replay log file 338. When a thread is active, as discussed below, this means that the partial replay controller 206 is being recorded and/or replayed. Recording of PBR state means that loads and stores, plus reads and writes of system registers, are recorded for later replay.

In the active state, the partial replay controller 206 is configured to access the record/replay log file 338 as previously discussed. The partial replay controller 206 is configured to update or record the record/replay log file 338 with the produced results from the executed load/store instructions 302L during re-execution of the instruction block 308. In this manner, if an exception occurs after execution of a load/store instruction 302L that is associated with a potential architectural state modification (e.g., a potential side-effect) (708 in FIG. 7), the produced result is stored by the load/store unit 320 in the record/replay log file 338. If an exception occurs during re-execution of the instruction block 308, the partial replay controller 206 sets the record/replay state 330 to a locked state ("LOCKED") for the exception to be resolved by exception handling in the operating system in the CPU 202. After the exception is resolved, the record/replay state 330 is set back to the active state ("ACTIVE") such that the instruction block 308 is re-executed (710 in FIG. 7). As previously discussed above, the produced results can be replayed during re-execution of the instruction block 308 after the exception is resolved so that the instruction block 308 can be successfully re-executed with previously recorded produced results in the event that such recorded produced results would be different due to a change, such as from another thread or data popped from an I/O device, as examples.

For example, the entry state 336 recorded for an executed load/store instruction 302L in the record/replay log file 338 could be none/null, load (normal), store (normal), annulled, load-committed (side-effect), store-committed (side-effect), read system register, and write system register-committed depending on the type of load/store instruction 302L executed, as non-limiting examples. A virtual address (VA) 342 recorded for an executed load/store instruction 302L is the address of the memory or I/O device accessed by the load/store instruction 302L, which is useful for debugging the program. Data 344 recorded for an executed load/store instruction 302L is the produced result as a result of executing the load/store instruction 302L.

Note that in one example, when the exception occurs when the record/replay state 330 is in the active state ("ACTIVE"), any produced results from instructions 302 that executed before the occurrence of the exception are not committed. The instruction block 308 is re-executed once the exception is resolved from the locked state ("LOCKED") (710 in FIG. 7). However, in an alternative aspect, the partial replay controller 206 could be configured to commit the produced results from the instructions 302 in the instruction block 308 that executed before the occurrence of the exception. In this instance, once the remaining instructions 302 are re-executed when the exception is resolved and the record/replay state 330 goes back to the active state ("ACTIVE"), only produced results from instructions 302 that did not previously execute are committed.

With continuing reference to FIG. 7, the record/replay state 330 remains in the active state ("ACTIVE") until all the instructions 302 in the instruction block 308 have been executed. Thereafter, the external produced results from the executed instructions 302 in the instruction block 308 are committed (or in the case of a partial commit functionality, produced results from instructions 302 that were not previously committed are committed) (712 in FIG. 7). As discussed earlier, in one example if a partial commit operation is employed, produced data from load/store instructions 302L that were committed during a previous execution of the instruction block 308 as part of a partial commit operation are not re-committed during a subsequent partial recommit operation of full commit when the instruction block 308 fully executes. The partial replay controller 206 sets the record/replay state 330 back to the idle state ("IDLE") to execute a next instruction block 308. If an exception occurs when the record/replay state 330 is in the idle state ("IDLE"), the operating system in the CPU 202 saves the current architectural state and switches the locked state "LOCKED" to resolve the exception such that no further instructions 302 are executed in the instruction block 308 (714 in FIG. 7). Once the exception is resolved in the locked state "LOCKED", the operating system restores the architectural state that existed before the exception occurred and switches the record/replay state 330 back to the idle state ("IDLE") (716 in FIG. 7).

In summary, a PBR model provided by the partial replay controller 206 in the processor 204 in FIG. 3 is only needed when an instruction block 308 performing operations with side-effects may later take any kind of exception. However, a PBR model may also be used to enhance debugging, when any precise exception is expected to cause program termination or transfer to a debugger for a block-atomic execution model. For performance reasons, a PBR model can optionally not be engaged for non-error exceptions (e.g., page fault) that may cause a supervisor service to be invoked and then normal execution resumed.

A summary of exemplary exception categories wherein an architectural state of an instruction block 308 can be preserved by employing the partial replay controller 206 is shown below. However, if the current instruction block 308 is executing with the PBR model enabled by the partial replay controller 206, an interrupt may be taken with a precise partial block state as well. As discussed previously and as shown in the table below, if an instruction block encounters side-effects or has stored produced data before an exception occurs, a partial replay controller could be configured to discard produced results from instructions that were executed in the instruction block before the exception occurred. After the processor recovers from the exception, the partial replay controller would then be configured to start execution back from the beginning instruction of the instruction block to record and/or replay results of the load/store instructions. Alternatively, the partial replay controller could be configured to commit the produced results from instructions that were executed in the instruction block before an exception occurred. After the processor recovers from the exception, the partial replay controller would then be configured to start from the next instruction in the instruction block that had not been executed to record and/or replay results of the load/store instructions that had not been previously executed in the instruction block during re-execution.

| Precision | Cause | Partial Block Replay | Block has performed side effects or stores | Architectural state | Reproducible |
|---|---|---|---|---|---|
| Precise | Block | N/A | No | Beginning of block | Yes |
|  | Instruction | No | No | Beginning of block | No |
|  |  | Yes | No | Beginning of block | Yes |
|  |  |  | Yes (normal stores discarded) | GPR/normal memory: Beginning of block Side-effects: After side effects | Yes |
|  |  |  | Yes (normal stores partially committed up to execution point) | GPR: Beginning of block Normal memory or side-effects: at the point of the exception | Yes |

In further aspects, the partial replay controller for controlling execution replay of an instruction block executed in a processor could be provided that includes a means for setting a means for storing a record/replay state to an active state for an instruction block, in response to detection of an instruction associated with a potential architectural state modification, or an occurrence of an exception in the processor. For example, the partial replay controller 206, the detection circuit 332 or the record/replay circuit 334 in FIG. 3 are examples of such a means for setting, where the partial replay controller 206 is configured to set the record/replay state 330 to the active state in response to detection of an instruction associated with a potential architectural state modification, or an occurrence of an exception in the processor 204. The partial replay controller 206 could also include a means for inspecting an entry state in a means for storing a record/replay log file corresponding to a next load/store instruction to be executed in the instruction block to determine if previously produced data is recorded for the next load/store instruction, in response to the means for storing the record/replay state to an active state for the instruction block. For example, this means for inspecting an entry state could be provided by the partial replay controller 206 or the record/replay circuit 334 in FIG. 3, by accessing the record/replay log file 338. The partial replay controller 206 could also include a means for recording produced data of the executed next load/store instruction in the means for storing the record/replay log file, in response to the previously produced data not being recorded in the means for storing the record/replay log file for the next load/store instruction. For example, the means for storing the record/replay log file could be provided by the partial replay controller 206 or the record/replay circuit 334 in FIG. 3 to store previously produced data not being recorded in the record/replay log file 338 for the next load/store instruction. The partial replay controller 206 could also include a means for executing the next load/store instruction using the previously produced data recorded for the next load/store instruction in the means for storing the record/replay log file, in response to the previously produced data being recorded in the means for storing the record/replay log file for the next load/store instruction. The means for executing the next load/store instruction using the previously produced data could be provided by the partial replay controller 206 or the record/replay circuit 334 in FIG. 3.

A processor that includes a partial replay controller configured to record and/or replay results of load/store instructions during re-execution of an instruction block, in response to detecting an instruction in the instruction block associated with a potential architectural state modification, and/or in response to an occurrence of an exception, during execution of instructions in the instruction block, such as the partial replay controller 206 in the processor 204 in FIG. 3 for example, and according to any of the examples disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

In this regard, FIG. 8 illustrates an example of a processor-based system 800 that includes a CPU 802 that includes one or more processors 804. The processor(s) 804 can each include a partial replay controller 806 that is configured to record and/or replay results of load/store instructions during re-execution of an instruction block, in response to detecting a potential side-effect during execution of instructions in the instruction block. The partial replay controller 806 can be the partial replay controller 206 in FIG. 3 as an example. The CPU 802 may have a cache memory 808 coupled to the processor(s) 804 for rapid access to temporarily stored data. The CPU 802 is coupled to a system bus 810 and can intercouple peripheral devices included in the processor-based system 800. The processor(s) 804 in the CPU 802 can communicate with these other devices by exchanging address, control, and data information over the system bus 810. Although not illustrated in FIG. 8, multiple system buses 810 could be provided, wherein each system bus 810 constitutes a different fabric. For example, the CPU 802 can communicate bus transaction requests to a memory controller 812 in a memory system 814 as an example of a slave device. In this example, the memory controller 812 is configured to provide memory access operations to a memory array 816 in the memory system 814.

Other devices can be connected to the system bus 810. As illustrated in FIG. 8, these devices can include the memory system 814, one or more input devices 818, one or more output devices 820, one or more network interface devices 822, and one or more display controllers 824, as examples. The input device(s) 818 can include any type of input device, including but not limited to input keys, switches, voice processors, etc. The output device(s) 820 can include any type of output device, including but not limited to audio, video, other visual indicators, etc. The network interface device(s) 822 can be any devices configured to allow exchange of data to and from a network 826. The network 826 can be any type of network, including but not limited to a wired or wireless network, a private or public network, a local area network (LAN), a wireless local area network (WLAN), a wide area network (WAN), a BLUETOOTH™ network, and the Internet. The network interface device(s) 822 can be configured to support any type of communications protocol desired.

The CPU 802 may also be configured to access the display controller(s) 824 over the system bus 810 to control information sent to one or more displays 828. The display(s) 828 can include any type of display, including but not limited to a cathode ray tube (CRT), a liquid crystal display (LCD), a plasma display, etc. The display controller(s) 824 sends information to the display(s) 828 to be displayed via one or more video processors 830, which process the information to be displayed into a format suitable for the display(s) 828.

A partial replay controller configured to record and/or replay results of load/store instructions during re-execution of an instruction block, in response to detecting a potential side-effect during execution of instructions in the instruction block, can also be provided in a software-based system. The partial replay controller does not have to be implemented in a hardware-only circuit that provides the functions of the partial replay controller without software instructions. The partial replay controller, such as the partial replay controller 206 in FIG. 3, could be provided in a non-transitory computer-readable medium having stored thereon computer executable instructions which, when executed by a processor, such a processor 204(1)-204(P) like in FIG. 2, cause the processor to set a record/replay state to an active state for an instruction block, in response to detection of an instruction associated with a potential architectural state modification, or an occurrence of an exception in the processor. In response to the record/replay state being an active state for the instruction block, the computer executable instructions which, when executed by a processor, cause the processor to inspect an entry state in a record/replay log file corresponding to a next load/store instruction to be executed in the instruction block to determine if previously produced data is recorded for the next load/store instruction, record produced data of the executed next load/store instruction in the record/replay log file, in response to the previously produced data not being recorded in the record/replay log file for the next load/store instruction, and execute the next load/store instruction using the previously produced data recorded for the next load/store instruction in the record/replay log file, in response to the previously produced data being recorded in the record/replay log file for the next load/store instruction.

The "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by a processor and that cause the processor to perform any one or more of the methodologies of the aspects disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A partial replay controller for controlling execution replay of an instruction block executed in a processor, comprising:
    a detection circuit configured to set a record/replay state to an active state for an instruction block, in response to detection of an instruction associated with a potential architectural state modification or an occurrence of an exception in the processor; and
    a record/replay circuit configured to, in response to the record/replay state being an active state for the instruction block:
        inspect an entry state in a record/replay log file corresponding to a next load/store instruction to be executed in the instruction block to determine if previously produced data is recorded for the next load/store instruction;
        record produced data of the executed next load/store instruction in the record/replay log file, in response to the previously produced data not being recorded in the record/replay log file for the next load/store instruction; and
        execute the next load/store instruction using the previously produced data recorded for the next load/store instruction in the record/replay log file, in response to the previously produced data being recorded in the record/replay log file for the next load/store instruction.

2. The partial replay controller of claim 1, wherein the detection circuit is further configured to detect an instruction in the instruction block associated with the potential architectural state modification, during execution of the instruction block by the processor.

3. The partial replay controller of claim 2, wherein the detection circuit comprises a side-effect detection circuit configured to:
    detect the instruction in the instruction block comprising a load/store instruction having a potential side-effect, during the execution of the instruction block by the processor; and
    in response to detection of the instruction comprising the load/store instruction having the potential side-effect, set the record/replay state to the active state for the instruction block.

4. The partial replay controller of claim 2, wherein the detection circuit comprises a side-effect detection circuit configured to:

detect the instruction in the instruction block comprising a write system configuration register instruction, during the execution of the instruction block by the processor; and in response to detection of the instruction comprising the write system configuration register instruction, set the record/replay state to the active state for the instruction block.

5. The partial replay controller of claim 2, wherein the detection circuit comprises a side-effect detection circuit configured to:

detect the instruction in the instruction block comprising an instruction having an expected exception, during the execution of the instruction block by the processor; and in response to detection of the instruction comprising the instruction having the expected exception, set the record/replay state to the active state for the instruction block.

6. The partial replay controller of claim 5, wherein the instruction having the expected exception comprises an instruction associated with an operation causing a static block exception.

7. The partial replay controller of claim 6, wherein the static block exception is comprised from the group consisting of: an instruction page fault; an invalid block header; and an invalid instruction encoding.

8. The partial replay controller of claim 5, wherein the instruction having the expected exception comprises an instruction associated with a watchpoint.

9. The partial replay controller of claim 5, wherein the instruction having the expected exception comprises an instruction associated with a breakpoint.

10. The partial replay controller of claim 5, wherein the instruction having the expected exception comprises an instruction associated with a debug step point.

11. The partial replay controller of claim 1 further configured to:

determine if all instructions in the instruction block have been executed; and commit external produced values by the executed instructions in the instruction block in response to determining all the instructions in the instruction block have been executed.

12. The partial replay controller of claim 1, wherein the record/replay circuit is further configured to record the record/replay state for the produced data of the executed next load/store instruction in the record/replay log file.

13. The partial replay controller of claim 1, wherein the record/replay circuit is further configured to record a virtual address addressed by the executed next load/store instruction in association with the produced data of the executed next load/store instruction in the record/replay log file.

14. The partial replay controller of claim 1, wherein the detection circuit is configured to detect the instruction in the instruction block associated with the potential architectural state modification, during execution of the instruction block by the processor when the record/replay state is in an idle execution state for the instruction block.

15. The partial replay controller of claim 14 configured to, in response to an exception occurring during the execution of the instruction block when the record/replay state is in the idle execution state, cause the instruction block to be re-executed.

16. The partial replay controller of claim 1, wherein, in response to an exception occurring during execution of the instruction block when the record/replay state is in the active state, the record/replay circuit is further configured to:

set the record/replay state for the instruction block to a locked state; and suspend recording of the produced data of the executed next load/store instruction in the record/replay log file, and suspend executing the next load/store instruction using the previously produced data recorded for the next load/store instruction.

17. The partial replay controller of claim 16, wherein, in response to the record/replay state for the instruction block returning to an active state from a previous locked state, the record/replay circuit is further configured to resume recording the produced data of the executed next load/store instruction in the record/replay log file and executing the next load/store instruction using the previously produced data recorded for the next load/store instruction.

18. The partial replay controller of claim 17, wherein, in response to the occurrence of the exception during the execution of the instruction block when the record/replay state is in the active state, the record/replay circuit is further configured to commit external produced values by executed instructions in the instruction block prior to the occurrence of the exception.

19. The partial replay controller of claim 18, wherein the record/replay circuit is further configured to commit the external produced values by the executed instructions in the instruction block executed after resuming execution of the next load/store instruction using the previously produced data recorded for the next load/store instruction in response to the record/replay state for the instruction block returning to the active state from the previous locked state.

20. The partial replay controller of claim 1 integrated into a system-on-a-chip (SoC).

21. The partial replay controller of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

22. A partial replay controller for controlling execution replay of an instruction block executed in a processor, comprising:

a means for setting a means for storing a record/replay state to an active state for an instruction block, in response to detection of an instruction associated with a potential architectural state modification, or an occurrence of an exception in the processor;

a means for inspecting an entry state in a means for storing a record/replay log file corresponding to a next load/store instruction to be executed in the instruction block to determine if previously produced data is recorded for the next load/store instruction, in response to the means for storing the record/replay state to an active state for the instruction block:

a means for recording produced data of the executed next load/store instruction in the means for storing the record/replay log file, in response to the previously produced data not being recorded in the means for storing the record/replay log file for the next load/store instruction; and a means for executing the next load/store instruction using the previously produced data recorded for the next load/store instruction in the means for storing the record/replay log file, in response to the previously produced data being recorded in the means for storing the record/replay log file for the next load/store instruction.

23. A method of replaying an instruction block in a processor, comprising:
setting a record/replay state to an active state for an instruction block in response to detection of an instruction associated with a potential architectural state modification, or an occurrence of an exception in the processor; and
in response to the record/replay state being an active state for the instruction block:
inspecting an entry state in a record/replay log file corresponding to a next load/store instruction to be executed in the instruction block to determine if previously produced data is recorded for the next load/store instruction;
recording produced data of the executed next load/store instruction in the record/replay log file, in response to the previously produced data not being recorded in the record/replay log file for the next load/store instruction; and
executing the next load/store instruction using the previously produced data recorded for the next load/store instruction in the record/replay log file, in response to the previously produced data being recorded in the record/replay log file for the next load/store instruction.

24. The method of claim 23, comprising a detection circuit configured to detect the instruction in the instruction block associated with the potential architectural state modification, during execution of the instruction block by the processor.

25. The method of claim 24, comprising:
detecting an instruction in the instruction block comprising a load/store instruction having a potential side-effect, during the execution of the instruction block by the processor; and
setting the record/replay state to the active state for the instruction block in response to detection of the instruction comprising the load/store instruction having the potential side-effect.

26. The method of claim 24, comprising:
detecting an instruction in the instruction block comprising a write system configuration register instruction, during the execution of the instruction block by the processor; and
setting the record/replay state to the active state for the instruction block in response to detection of the instruction comprising the write system configuration register instruction.

27. The method of claim 24, comprising:
detecting an instruction in the instruction block comprising an instruction having an expected exception, during the execution of the instruction block by the processor; and
setting the record/replay state to the active state for the instruction block in response to detection of the instruction comprising the instruction having the expected exception.

28. The method of claim 23, wherein, in response to an exception occurring during execution of the instruction block when the record/replay state is in the active state, further comprises:
setting the record/replay state for the instruction block to a locked state; and
suspending recording the produced data of the executed next load/store instruction in the record/replay log file, and suspending executing the next load/store instruction using the previously produced data recorded for the next load/store instruction.

29. The method of claim 23, further comprising committing external produced values by executed instructions in the instruction block prior to the occurrence of the exception, in response to the occurrence of the exception during the execution of instruction block when the record/replay state is in the active state.

30. A non-transitory computer-readable medium having stored thereon computer executable instructions which, when executed by a processor, cause the processor to:
set a record/replay state to an active state for an instruction block, in response to detection of an instruction associated with a potential architectural state modification, or an occurrence of an exception in the processor; and
in response to the record/replay state being an active state for the instruction block:
inspect an entry state in a record/replay log file corresponding to a next load/store instruction to be executed in the instruction block to determine if previously produced data is recorded for the next load/store instruction;
record produced data of the executed next load/store instruction in the record/replay log file, in response to the previously produced data not being recorded in the record/replay log file for the next load/store instruction; and
execute the next load/store instruction using the previously produced data recorded for the next load/store instruction in the record/replay log file, in response to the previously produced data being recorded in the record/replay log file for the next load/store instruction.

* * * * *